Aug. 29, 1961    A. P. BRANAMAN    2,998,159
WATERMELON TRAY
Filed May 12, 1958

INVENTOR.
Arthur P. Branaman
BY
C. M. McKnight
ATTORNEY

United States Patent Office 2,998,159
Patented Aug. 29, 1961

2,998,159
WATERMELON TRAY
Arthur P. Branaman, 3909 S. 49th W. Ave.,
Rte. 15, Box 100, Tulsa, Okla.
Filed May 12, 1958, Ser. No. 734,795
1 Claim. (Cl. 220—85)

This invention relates to improvements in tray devices, and more particularly, but not by way of limitation, to a novel tray or receptacle for facilitating the eating of watermelon, and the like.

It is well known that there are certain inherent difficulties encountered in the eating of watermelon due to the extreme juiciness thereof and the excessive number of inedible seeds contained therein. The eating of watermelon without a receptacle or plate creates a hazard to cleanliness, both to the person eating the melon and to the environment therearound. Furthermore, the plate or receptacle frequently used for holding the portion or slice of watermelon being eaten usually becomes filled with the watermelon juice and seeds. As a result, the plate is awkward to handle without an accidental spilling of the contents thereof.

The present invention provides an improved receptacle for holding a portion or slice of watermelon during the eating thereof. The novel device comprises an upper perforated plate member for retaining the watermelon slice while permitting the seeds and juice therefrom to drain into a lower compartment. The lower compartment retains the juice and seeds and substantially eliminates the accidental spilling thereof. The upper plate, therefore, provides a substantially clean and uncluttered surface for retaining the watermelon slice, thereby increasing the pleasure of eating the melon.

It is an important object of this invention to provide an improved eating utensil or receptacle.

It is another object of this invention to provide an improved receptacle particular designed and constructed for facilitating the eating of watermelon, and the like.

Another object of this invention is to provide an improved tray for the eating of watermelon wherein the melon is retained on a substantially clean and uncluttered surface.

Still another object of this invention is to provide an improved tray for the eating of watermelon wherein the juice and seeds of the melon are retained within a compartment for substantially eliminating any accidental spilling thereof.

It is a further object of this invention to provide a novel tray or receptacle which is simple and efficient in operation and economical and durable in construction.

Other objects and advantages of the invention will be evident from the following detailed description, read in conjunction with the accompanying drawings, which illustrate my invention.

Figure 1:
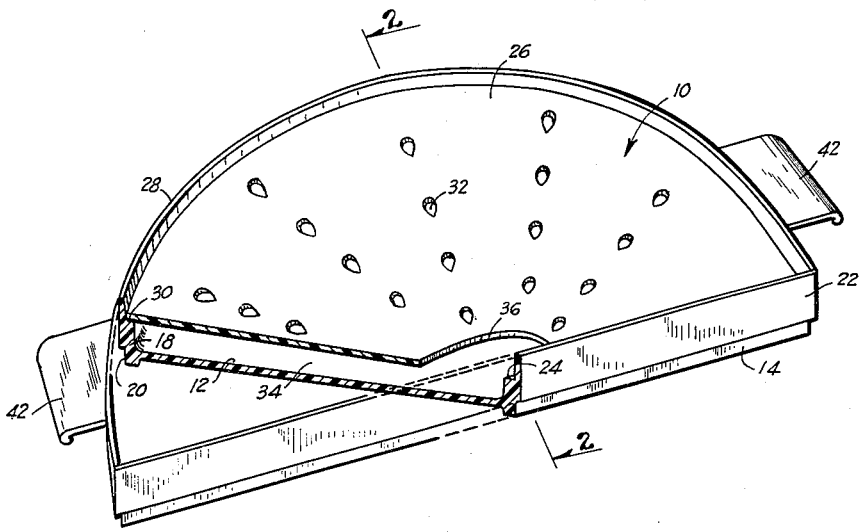
FIGURE 1 is a perspective view of a tray embodying the invention, and having a portion thereof cut away for purposes of illustration.
Figure 2:
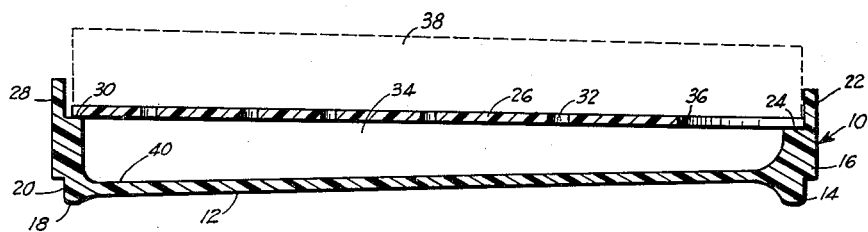
FIGURE 2 is a sectional elevational view taken on line 2—2 of FIG. 1.

Referring to the drawings in detail, reference character 10 refers in general to the novel tray preferably of a semi-circular configuration as shown in FIG. 1, but not limited thereto. The tray 10 is provided with a bottom plate member 12 preferably of a semi-circular configuration. A flange member 14 extends downwardly from the substantially straight edge portion 16 of the bottom plate 12 to provide a front leg for the tray 10. A plurality of knobs or leg members 18 are spaced adjacent the arcuate edge 20 of the plate 12 and extend downwardly therefrom to provide rear legs for the tray 10. It will be apparent from FIG. 2 that the front leg 14 is slightly longer than the rear legs 18 in order to raise the front edge 20 of the plate 12 so that the plane or surface of the bottom 12 will incline rearwardly, for a purpose as will be hereinafter set forth.

An upstanding flange 22 is provided along the straight front edge 16 of the bottom 12. The flange 22 is provided with an inwardly directed shoulder 24 for receiving an arcuate or semi-circular plate member 26 as will be hereinafter set forth. An arcuate flange member 28 extends upwardly from the arcuate edge 20 of the bottom member 12 and is in connection with the opposed ends of the flange 22 to provide a continuous upwardly extending flange around the periphery of the bottom member 12. The flange 28 is provided with an inwardly directed shoulder 30 for receiving the plate 26 thereon. The shoulder 30 is inclined upwardly in a direction from the opposed ends of the shoulder 24 toward the center of the arcuate flange 28 in order to elevate the rear portion of the plate 26 with respect to the front portion thereof for a purpose as will be hereinafter set forth.

The plate member 26 is preferably of a semi-circular configuration complementary to the configuration of the bottom member 12 as clearly depicted in the drawings. A plurality of spaced apertures 32 are provided on the plate 26 in order to permit liquids, such as watermelon juice or the like, to drain therethrough into the chamber 34 formed between the plate 26 and bottom 12. In addition, an arcuate cut away portion 36 is provided in the plate 26 adjacent the front flange 22 and is preferably centered thereon to permit liquid and larger objects, such as watermelon seeds, to drop into the chamber 34, as will be hereinafter set forth.

Operation

The tray 10 as shown herein is particularly designed and constructed for utilization with a slice of watermelon 38 (FIG. 2) which has been cut in a semi-circular configuration, but is not limited thereto. The melon slice 38 is placed on the upper perforated plate 26 as clearly shown in FIG. 2. It will be apparent that juice from the watermelon slice will tend to run or drain downwardly by gravity toward the front flange 22 due to the inclination of the plate 26 as hereinbefore set forth. Portions of the liquid will drain or flow through the apertures 32 into the chamber 34 where the liquid will collect on the bottom 12 of the tray 10. The heavier portions of the watermelon residue, such as the seeds thereof, will also tend to move downwardly by gravity along the plate 26, and any seeds that are too large to pass through the apertures 32 and into the chamber 34 will fall through the central opening 36. The seeds of a watermelon are usually very slippery because of the lubrication afforded by the watermelon juice and will, therefore, slide readily along the surface of the plate 26.

The juice or liquid from the melon, as well as the seeds therefrom, will tend to accumulate at the rear portion 40 (FIG. 2) of the chamber 34 and adjacent the rear flange 28 due to the rearwardly inclination of the bottom plate 12 as hereinbefore set forth. When the melon slice 38 has been consumed, the upper plate member 26 may be easily removed from the position adjacent the shoulders 24 and 30 for ease of disposal of the watermelon rind or residue (not shown).

It will be apparent that suitable handle members 42 (FIG. 1) may be diametrically disposed on the arcuate flange 28, if desired, in order to facilitate the carrying or transporting of the tray 10. In addition, the upper plate 26 may be radially inclined (not shown) toward the central opening 36 in order to facilitate drainage of the watermelon seeds and residue therethrough, if desired. It will be apparent that the inwardly directed shoulder 24 may be inclined toward the longitudinal center thereof complementary to the configuration of the upper plate 26 for efficiently supporting the plate thereon.

From the foregoing, it will be apparent that the present invention provides a novel tray for facilitating the handling of watermelon, and the like, during the eating thereof. The novel tray provides a substantially clean surface for retaining the melon during the eating thereof, thus greatly enhancing the pleasure which may be derived therefrom. The novel watermelon tray is simple and efficient in utilization and economical and durable in construction.

Changes may be made in the combination and arrangement of parts as heretofore set forth in the specification and shown in the drawings, it being understood that any modification in the precise embodiment of the invention may be made within the scope of the following claim without departing from the spirit of the invention.

I claim:

A tray for serving a watermelon slice and comprising an arcuately shaped receptacle member having at least one straight edge, a removable arcuately shaped plate member disposed within the receptacle in an inclined position for receiving the melon slice, said plate member provided with a plurality of spaced apertures to permit passage of melon juice from the plate into the receptacle, the plate member also provided with an arcuate cut away portion adjacent a straight edge of the receptacle member for passage therethrough of melon residue and seeds, an upstanding flange provided around the periphery of the receptacle member for substantially precluding accidental spilling of the residue therefrom, a bottom member inclined oppositely from the plate provided on the receptacle for facilitating the accumulation of the melon residue therein, and handle means provided on the receptacle for facilitating the handling thereof.

References Cited in the file of this patent
UNITED STATES PATENTS

| | | |
|---|---|---|
| 943,750 | Leeking | Dec. 21, 1909 |
| 1,801,934 | Pearson | Apr. 21, 1931 |
| 1,813,670 | Kessler | July 9, 1931 |
| 2,257,970 | Long | Oct. 7, 1941 |
| 2,459,657 | Klein | Jan. 18, 1949 |
| 2,650,485 | Greca | Sept. 1, 1953 |